United States Patent Office 3,509,050
Patented Apr. 28, 1970

---

3,509,050
ANTIFRICTION MATERIALS
Vasily Vladimirovich Korshak, Irina Alexandrovna Gribova, Alexandr Petrovich Krasnov, Alla Nikolaevna Chumaevskaya, and Rostislav Lazarevich Brontman, Moscow, U.S.S.R., assignors to Institut Elementoorganicheskikh Soedineny Akademii Nauk, U.S.S.R., Moscow, U.S.S.R.
No Drawing. Filed Dec. 6, 1967, Ser. No. 688,372
Claims priority, application Union of Soviet Socialist Republics, Dec. 8, 1966, 1,114,868
Int. Cl. C10m 7/26, 7/16, 7/06
U.S. Cl. 252—12
13 Claims

ABSTRACT OF THE DISCLOSURE

A plastic antifriction material consisting of phenolphthalein-phenol-formaldehyde resin and molybdenum disulfide as a filler.

---

This invention relates to plastic antifriction materials.

The antifriction material of the present invention is intended for use in the form of compression molded elements, in dry friction assemblies.

There are known in the art antifriction materials derived from phenol-formaldehyde resins and fillers, e.g., graphite, molybdenum disulfide, etc.

The known antifriction materials suffer from the disadvantage of having a variable coefficient of friction and of exhibiting low wear resistance at elevated temperatures.

Moreover, the known antifriction materials display low impact strength, so that the scope of their applicability is limited.

It is an object of the present invention to provide an antifriction material which has a constant coefficient of friction over in a wide temperature range, adequate wear resistance at elevated temperatures and high impact strength, and which will, therefore, lend itself to fabrication into elements for use in sliding and rolling friction assemblies at elevated temperatures.

This and other objects of the present invention are accomplished by the provision of an antifriction material comprising phenolphthalein-phenol-formaldehyde resin as a polymer component. It is advantageous to employ an antifriction material-containing from 10 to 40% by weight of said phenolphthalein-phenol-formaldehyde resin.

In order to stabilize the coefficient of friction and to enhance the wear resistance of the present antifriction material at elevated temperatures, it is good practice to incorporate into the filler which is used, a pulverant hard mineral, e.g., quartz, diamond, or silicon nitride, the preferred amount of said hard material being not greater than 8% based on the weight of the antifraction material.

The filler composition may include, in addition to molybdenum disulfide or a molybdenum disulfide-pulverant hard mineral mixture, an organic or inorganic fibrous material in the form of cloth, fiber, wool, cord, thread waste, felt, etc., the incorporation of such fibrous materials being instrumental in increasing the impact strength of the present antifriction material, provided its content does not exceed 30% of the antifriction material weight.

To diminish the coefficient of friction at elevated temperatures, it is expedient to incorporate into the present antifriction material containing phenolphthalein-phenol-formaldehyde resin and molybdenum disulfide, an epoxy group-containing compound, e.g., epichlorohydrin, the latter being taken in an amount of not greater than 10% based on the weight of the phenolphthalein-phenol-formaldehyde resin used.

The present antifriction material is prepared in the following manner.

The components of the antifriction material, viz., phenolphthalein-phenol formaldehyde resin and filler (molybdenum disulfide) of adequate fineness (degree of dispersion) are subjected to mixing until the mixture is completely homogeneous, and the mixture thus obtained is compression molded.

Where the filler also contains a pulverant hard mineral, the above procedure should be preceded by subjecting the pulverant hard mineral and molybdenum disulfide powder to mixing by the vibration technique.

The filler mixture thus obtained is incorporated into phenolphthalein-phenol-formaldehyde resin, followed by preparing the antifriction material in accordance with the procedure disclosed hereinabove.

If the filler contains, in addition to molybdenum disulfide, a fibrous material, the present antifriction material should be prepared as follows.

The molybdenum disulfide powder is mixed with an alcoholic solution of phenolphthalein-phenol-formaldehyde resin, and the suspension thus obtained is used to impregnate the fibrous material, followed by drying and compression molding the impregnated material.

Where recourse is had to a filler comprised of molybdenum disulfide, hard minerals and a fibrous material, the pulverant molybdenum disulfide and hard mineral are jointly comminuted and thereafter mixed with an alcoholic solution of phenolphthalein-phenol-formaldehyde resin, and the suspension thus prepared is used to impregnate the fibrous material. Next the fibrous material is dried and compression molded.

The antifriction material comprised of phenolphthalein-phenol-formaldehyde resin and molybdenum disulfide may also include an epoxy group-containing additive, which additive is incorporated into the mixture of phenolphthalein-phenol-formaldehyde resin and molybdenum disulfide, and the blend thus prepared is compression molded.

For the purposes of enhancing the thermal and electrical conductivity of the present antifriction material, improving its moldability, increasing its hardness and obtaining better wear resistance characteristics, it is good practice to incorporate into each antifriction material formulation specified hereinabove a metal powder, e.g., powdered copper, silver, etc., the amount of the metal powder used being 10 to 20% of the antifriction material weight.

Presented below by way of illustration only are specific examples of accomplishing the process of antifriction material manufacture.

EXAMPLE 1

Into a vibrating mill were charged 42 grams of phenolphthalein-phenol-formaldehyde resin and 258 grams of molybdenum disulfide (particle size, 1 to 15$\mu$).

The contents of the mill were mixed for a period of 2 minutes and thereafter the mixture thus obtained was subjected to compression molding at a temperature of 180–250° C. and a specific pressure of 1,000 kg./cm.$^2$.

EXAMPLE 2

15 grams of quartz were comminuted in a vibrating mill for a period of 5 minutes, and to the pulverant quartz thus obtained were added 189 grams of molybdenum disulfide powder (particle size, 1 to 15$\mu$), 36 grams of phenolphthalein-phenol-formaldehyde resin and 60 grams of copper powder. The mixture was mixed for a period of 2 minutes and thereafter processed as disclosed in Example 1.

EXAMPLE 3

Into a vibrating mill were charged 15 grams of asbestos and 189 grams of molybdenum disulfide powder and the contents of the mill were mixed for a period of 25 minutes, followed by adding to the mixture obtained (particle size, 1 to 15μ) 36 grams of phenolphthalein-phenol-formaldehyde resin and 60 grams of nickel powder, and thereafter subjecting the formulation to mixing for a period of 2 minutes.

The mixture was processed into finished elements as disclosed in Example 1.

EXAMPLE 4

Into a vibrating mill were charged 182 grams of molybdenum disulfide powder (particle size, 1 to 15μ) and 3.6 grams of epichlorohydrin. The contents of the mill were mixed for a period of 6 minutes, followed by incorporating into the obtained mass 36 grams of phenolphthalein-phenolformaldehyde resin and 75 grams of copper powder and subjecting the formulation to mixing for a period of 2 minutes.

The mixture was processed into finished elements as disclosed in Example 1.

EXAMPLE 5

Into a vibrating mill were charged 185.4 grams of molybdenum disulfide powder (particle size, 1 to 15μ), 36 grams of phenolphthalein-phenol-formaldehyde resin, 75 grams of copper powder, and 3.6 grams of epoxy resin derived from epichlorohydrin and diphenylolpropane. The contents of the mill were mixed for a period of 2 minutes.

The mixture was processed into finished elements as disclosed in Example 1.

The antifriction material prepared as disclosed in Examples 1 through 5 is noted for its stable coefficient friction and enhanced wear resistance at elevated temperatures. The material exhibits the following physical and mechanical characteristics:

Brinell hardness—27–32 kg./mm.$^2$
Compression strength—1,200–1,600 kg./cm.$^2$
Coefficient of friction—0.14

EXAMPLE 6

Into a vibrating mill were charged 658.35 grams of molybdenum disulfide power and 34.65 grams of asbestos, followed by mixing the contents of the mill for a period of 25 minutes.

Then 693 grams of the mass thus prepared were mixed with 924 grams of phenolphthalein-phenol-formaldehyde resin dissolved in alcohol and 321 grams of silver powder.

The suspension thus prepared was used for impregnating a cotton cloth strip weighing 462 grams, followed by drying the impregnated strip and subjecting it to compression molding at a temperature of 170–200° C. and a specific pressure of 800 kg./cm.$^2$.

EXAMPLE 7

In an impregnating tank were mixed 693 grams of molybdenum disulfide powder (particle size, 1 to 15μ), an alcoholic solution of 924 grams of phenolphthalein-phenol-formaldehyde resin, and 321 grams of silver powder.

Next 462 grams of abestos in the form of fibers from 1.5 to 5 cm. long were impregnated with suspension obtained and thereafter subjected to compression molding at a temperature of 180–200° C. and a specific pressure of 1,000 kg./cm.$^2$.

EXAMPLE 8

Into a vibrating mill were charged 658.35 grams of molybdenum disulfide and 34.65 grams of asbestos, and the contents of the mill were mixed for a period of 25 minutes.

Next, into 693 grams of the mixture thus obtained were incorporated an alcoholic solution of 924 grams of phenolphthalein-phenol-formaldehyde resin and 231 grams of silver powder.

The resultant suspension was used for impregnating a polyacrylonitrile fabric strip weighting 462 grams. Upon impregnation, the strip was subjected to compression molding at a temperature of 170–200° C. and a specific pressure of 80 kg./cm.$^2$.

The antifriction material prepared as disclosed in Examples 6 through 8 is noted for its good wear resistance at elevated temperatures, exhibits enhanced impact strength and has the following physical and mechanical characteristics:

Impact strength—10–14 kg./cm./cm.$^2$
Brinell hardness—16–20 kg./mm.$^2$
Coefficient of friction—0.14

EXAMPLE 9

In an impregnating tank were mixed 530 grams of molybdenum disulfide power (particle size, 1 to 15μ), 120 grams of glass fibers in the form of thread waste, and 350 grams of phenolphthalein-phenol-formaldehyde resin dissolved in alcohol.

The mixture thus prepared was subjected to compression molding at a temperature of 180–200° C. and a specific pressure of 1,000 kg./cm.$^2$ The antifriction material prepared by following the procedure disclosed in Example 9 is noted for its good wear resistance at elevated temperature, displays a low coefficient of friction and has the following physical and mechanical characteristics:

Brinell hardness—23–26 kg./mm.$^2$
Compression strength—1,000–1,200 kg./cm.$^2$
Impact strength—6 kg./cm./cm.$^2$
Coefficient of friction—0.03–0.05

Although the present invention has been described with reference to a preferred embodiment thereof, it will be readily understood by those skilled in the art that various changes and modifications may be made in carrying out the present invention without deviating from the spirit and scope of the invention.

These changes and modifications are to be considered as falling within the spirit and scope of the invention as defined in the appended claims.

We claim:

1. A plastic antifriction material consisting of phenolphthalein-phenol-formaldehyde resin and a filler consisting of powdered molybdenum disulfide.

2. A plastic antifriction material according to claim 1, which contains 10–40 weight percent of phenol-phthalein-phenol-formaldehyde resin and 90–60 weight percent of powdered molybdenum disulfide.

3. A plastic antifriction material according to claim 1, wherein the filler further contains a powdered hard mineral and metal powders.

4. A plastic antifriction material according to claim 3, which contains 10–40 weight percent of phenol-phthalein-phenol-formaldehyde resin, 62–42 weight percent of powdered molybdenum disulfide, 8 weight percent of a powdered hard mineral, and 20–10 weight percent of a metal powder.

5. A plastic antifriction material according to claim 1, wherein the filler further contains fibrous materials.

6. A plastic antifriction material according to claim 5, which consists of 10–40 weight percent of phenolphthalein-phenol-formaldehyde resin, 80–30 weight percent of molybdenum disulfide, and 10–30 weight percent of fibrous materials.

7. A plastic antifriction material according to claim 1, wherein the filler further contains fibrous materials and metal powders.

8. A plastic antifriction material according to claim 7, which consists of 10–40 weight percent of phenolphthalein-phenol-formaldehyde resin, 60–20 weight percent of powdered molybdenum disulfide, 10–30 weight percent of fibrous materials and 20–10 weight percent of metal powder.

9. A plastic antifriction material according to claim 1, wherein the filler further contains metal powders, and an additive consisting of an epoxy group-containing compound selected from the group consisting of epichlorohydrin and epichlorohydrin-diphenylolpropane resin.

10. A plastic antifriction material according to claim 9, which consists of 10–40 weight percent of phenolphthalein-phenol-formaldehyde resin, 69–46 weight percent of molybdenum disulfide, 20–10 weight percent of metal powder, and 1–4 weight percent of an epoxy group-containing compound.

11. A plastic antifriction material according to claim 3, wherein the powdered hard mineral is powdered quartz, diamond or silicon nitride and the metal powder is powdered copper or silver.

12. A plastic antifriction material according to claim 5 wherein the fibrous material is cloth, fiber, wool, cord, thread or felt.

13. A plastic antifriction material according to claim 9 wherein the epoxy group containing compound is epichlorohydrin.

References Cited

UNITED STATES PATENTS 3,014,865  12/1961  Seniff et al. _____ 252—12

DANIEL E. WYMAN, Primary Examiner

I. VAUGHN, Assistant Examiner